United States Patent
Naito et al.

(10) Patent No.: US 8,778,483 B2
(45) Date of Patent: Jul. 15, 2014

(54) OPTICAL ARTICLE AND METHOD FOR PRODUCING THE SAME

(75) Inventors: Shuji Naito, Ina (JP); Yosuke Sugihara, Suwa (JP)

(73) Assignee: Hoya Lens Manufacturing Philippines Inc., Cavite (PH)

( * ) Notice: Subject to any disclaimer, the term of this patent is extended or adjusted under 35 U.S.C. 154(b) by 785 days.

(21) Appl. No.: 12/756,912

(22) Filed: Apr. 8, 2010

(65) Prior Publication Data

US 2010/0279088 A1 Nov. 4, 2010

(30) Foreign Application Priority Data

Apr. 30, 2009 (JP) ................................ 2009-110471

(51) Int. Cl.
| | |
|---|---|
| B32B 7/02 | (2006.01) |
| G02B 1/04 | (2006.01) |
| B32B 27/40 | (2006.01) |
| G02B 1/11 | (2006.01) |
| C08L 75/04 | (2006.01) |
| C04B 35/46 | (2006.01) |

(52) U.S. Cl.
CPC . *B32B 7/02* (2013.01); *G02B 1/041* (2013.01); *B32B 27/40* (2013.01); *B32B 2307/40* (2013.01); *G02B 1/115* (2013.01); *C08L 75/04* (2013.01); *C04B 35/46* (2013.01); *C01P 2004/64* (2013.01)
USPC ........ 428/212; 428/423.1; 428/323; 428/328; 359/580; 351/159.62

(58) Field of Classification Search
CPC ...... B32B 7/02; B32B 27/04; B32B 2307/40; G02B 1/041; G02B 1/115; C08L 75/04; C04B 35/46; C01P 2004/64
USPC ...... 428/212–220, 323, 328, 423.1; 359/580; 351/159.62; 528/44–85; 526/301
See application file for complete search history.

(56) References Cited

U.S. PATENT DOCUMENTS

| | | | |
|---|---|---|---|
| 6,440,568 B1 * | 8/2002 | Kayanoki et al. | 428/425.9 |
| 7,105,583 B2 * | 9/2006 | Hu | 522/90 |
| 2009/0040457 A1 | 2/2009 | Nakajima et al. | 351/166 |
| 2009/0324956 A1 | 12/2009 | Otani et al. | |

FOREIGN PATENT DOCUMENTS

| | | | | |
|---|---|---|---|---|
| EP | 2040100 A1 * | 3/2009 | | G02B 5/23 |
| JP | 08248204 A | 9/1996 | | |
| JP | 2001201602 A | 7/2001 | | |
| JP | 2001-233611 | 8/2001 | | |
| jp | 2004-002712 | 1/2004 | | |

(Continued)

OTHER PUBLICATIONS

Lee et al. Aqueous Polyurethane Dispersion: Effects of DMPA and Bisphenol a Polyol on Dispersion and Physical Properties of Emulsion Cast Film. Polymer International, 28 (1992); pp. 157-162.*

(Continued)

*Primary Examiner* — Prashant J Khatri
(74) *Attorney, Agent, or Firm* — DLA Piper LLP (US)

(57) ABSTRACT

A method for producing an optical article includes laminating on a plastic substrate a first layer using a first composition. The first composition includes a first polyurethane resin containing an aromatic ring, a second polyurethane resin containing a carbonate backbone, metal oxide particulates, and an organosilicon compound.

2 Claims, 1 Drawing Sheet

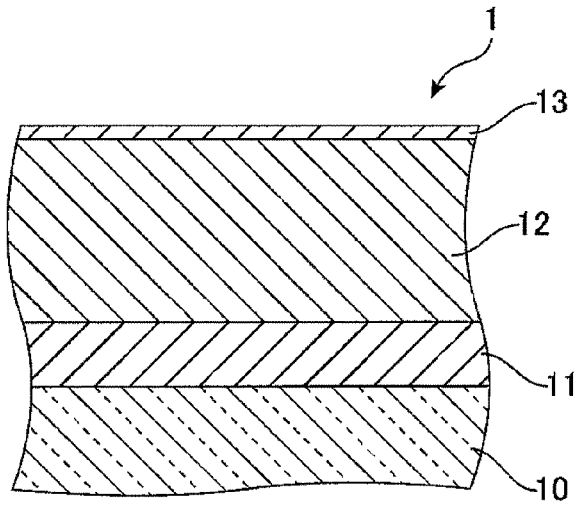

(56) References Cited

FOREIGN PATENT DOCUMENTS

| JP | 2005-281527 | 10/2005 |
| JP | 2005-301208 | 10/2005 |
| JP | 2006-126782 | 5/2006 |
| JP | 2007-102096 | 4/2007 |
| WO | 2008001875 A1 | 1/2008 |

OTHER PUBLICATIONS

Dobrowolski, J.A. "Optical Properties of Films and Coatings". Handbook of Optics: vol. I, Fundamentals, Techniques and Design, (1995); pp. 42.3-42.130.*

Adam et al. "Polyurethanes". Ullmann's Encyclopedia of Industrial Chemistry, (2005); pp. 545-604.*

* cited by examiner

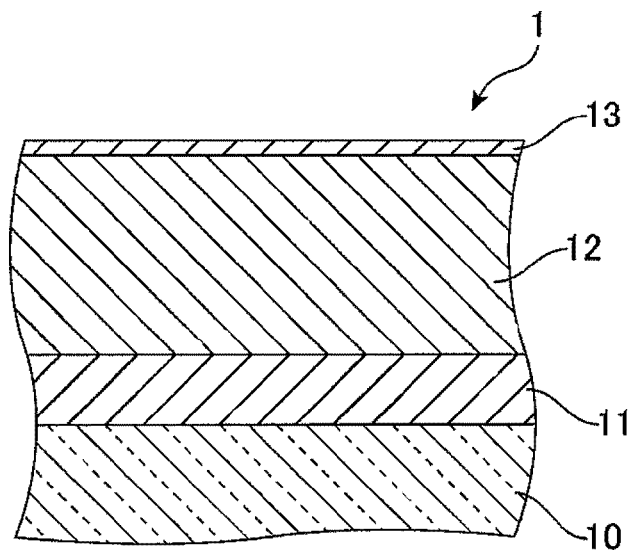

FIG. 1

| | SUPERFLEX 210 | SUPERFLEX 460 | F2929D | INTERFERENCE FRINGES | SHOCK RESISTANCE | HAZE |
|---|---|---|---|---|---|---|
| EXAMPLE 1 | 240 WT PARTS | 110 WT PARTS | 560 WT PARTS | GOOD | EXCELLENT | GOOD |
| EXAMPLE 2 | 285 WT PARTS | 260 WT PARTS | 400 WT PARTS | GOOD | EXCELLENT | GOOD |
| EXAMPLE 3 | 300 WT PARTS | - | 630 WT PARTS | GOOD | EXCELLENT | GOOD |
| EXAMPLE 4 | 180 WT PARTS | - | 770 WT PARTS | GOOD | EXCELLENT | GOOD |
| EXAMPLE 5 | 420 WT PARTS | 390 WT PARTS | - | GOOD | GOOD | GOOD |
| COMPARATIVE EXAMPLE 1 | 840 WT PARTS | - | - | GOOD | POOR | GOOD |
| COMPARATIVE EXAMPLE 2 | - | - | 980 WT PARTS | FAIR | EXCELLENT | POOR |

FIG. 2

OPTICAL ARTICLE AND METHOD FOR PRODUCING THE SAME

BACKGROUND

1. Technical Field

The present invention relates to an optical article suitable for use as a plastic lens for spectacles, cameras, and the like, and also to a method for producing the same.

2. Related Art

As compared with glass lenses, plastic lenses are lightweight, have excellent moldability, workability, dye affinity, and the like, and are resistant to breakage and highly safe. On this account, plastic lenses have been rapidly spread in the field of spectacle lenses, and now account for a large share. In recent years, in order to meet the increasing demands for thinner and lighter lenses, high-refractive-index materials, such as thiourethane-based resins and episulfide-based resins, have been developed.

JP-A-2004-002712 and JP-A-2005-281527 propose a method for producing an episulfide-based resin with a high refractive index, the method including polymerizing an epithio-group-containing compound (episulfide compound) in the presence of sulfur. Such an episulfide-based resin can readily develop a high refractive index of 1.7 or more, and thus is effective in providing spectacle lenses with reduced thickness.

A known example of an optical article, such as a spectacle lens, is one having a primer layer that is formed on the surface of a plastic substrate and a hard coating layer that is formed on the surface of the primer layer; the primer layer mainly serves to provide adhesion and shock resistance, and the hard coating layer mainly serves to provide scratch resistance and abrasion resistance. With respect to such an optical article, when the plastic substrate has an increased refractive index, in order to prevent the formation of interference fringes, the primer layer and the hard coating layer also have to have refractive indices close to that of the plastic substrate.

According to a common practice, for example, any of various metal oxides is included as a filler in a hard coating layer to increase the refractive index thereof. As such metal oxides, titanium oxide, zirconium oxide, antimony oxide, tin oxide, and the like are usable alone or in the form of composite particulates. Metal oxides generally have poor light resistance and are susceptible to staining. Therefore, considering transparency in the visible region, stability, and the like, titanium oxide is chiefly used.

However, titanium oxide is photocatalytic under ultraviolet radiation. When used as a filler in a hard coating layer, titanium oxide will decompose the binder component formed of the surrounding organic resin, causing separation of the hard coating layer. For this reason, as described in JP-A-2007-102096, in a hard coating layer, titanium dioxide is often employed not in the anatase form, which is likely to exhibit photocatalytic activity, but in the rutile form, which has less photocatalytic activity.

When the refractive index varies greatly between a plastic substrate and a primer layer and/or between a primer layer and a hard coating layer, the difference in refractive index leads to the formation of interference fringes. In recent years, with an advent of high-refractive-index plastic substrates having an refractive index of more than 1.7, for the purpose of suppressing interference fringes, attempts have been made to provide, not only a hard coating layer, but also a primer layer with a high refractive index.

In order to increase the refractive indices of a hard coating layer, a primer layer, and like layers (functional layers) laminated on a lens substrate, mainly, the proportion of metal oxide particulates (metal oxide sol) in a composition forming each layer has to be increased.

Meanwhile, high-refractive-index lens materials are relatively vulnerable, so the hard coating layer and the primer layer, especially the primer layer, are desired to have sufficient shock resistance (shock absorption). The shock absorption of a primer layer is imparted by a resin component in a composition for forming the primer layer. However, when the proportion of metal oxide particulates is, increased in an attempt to achieve a high refractive index, the shock absorption may be insufficiently exhibited.

SUMMARY

An advantage of some aspects of the invention is to provide an optical article that exhibits excellent shock resistance (shock absorption) and also allows the suppression of interference fringes even when a plastic substrate with a high refractive index is used therein, and a method for producing the same.

One aspect of the invention provides a method for producing an optical article, including laminating on a plastic substrate a first layer using a first composition that includes: (A1) a first polyurethane resin containing an aromatic ring, (A2) a second polyurethane resin containing a carbonate backbone, (B) metal oxide particulates, and (C) an organosilicon compound.

By using the first composition that includes different kinds of polyurethane resins, metal oxide particulates, and an organosilicon compound, a layer that exhibits high shock absorption and has a refractive index varying inside the layer can be formed. Typically, in the first layer, the refractive index of its surface layer (surface) can be reduced below the refractive index of a base layer (base) that serves as the interface with the plastic substrate and/or the refractive index of an intermediate layer (interior) of the first layer. That is, this provides the first layer with a refractive, index decreasing (gradient) continuously or stepwise (intermittently) in the direction away from the plastic substrate. As used herein, the surface layer refers to the surface on the side opposite to the plastic-substrate side. The intermediate layer refers to the interior of the first layer excluding the surface layer.

Therefore, when a second layer having a refractive index lower than that of the plastic substrate is laminated on the first layer, the difference in refractive index can be practically eliminated or reduced between the plastic substrate and the first layer and also between the first layer and the second layer. That is, this enables a refractive index to decrease continuously or stepwise (intermittently) from the plastic layer via the first layer to the second layer, and the formation of interference fringes can also be suppressed.

An aromatic ring (e.g., benzene ring) has a highly symmetric molecular structure. When such aromatic rings gather due to polar groups attracting one another, this results in an extremely compact structure (hard segments). Therefore, when at least one of the polyurethane resins used is a polyurethane resin containing an aromatic ring, the resulting first layer has a higher density, and the refractive index thereof can be increased.

However, when many of the polyurethanes resins used are aromatic-ring-containing polyurethane resins, due to an increase in hard segments, the crystallinity of the resulting first layer may be extremely high, reducing the shock resistance thereof. When at least one of the polyurethane resins used is a carbonate-based polyurethane resin (polyurethane resin containing a carbonate backbone), this moderately mitigates the crystallinity of the resulting first layer, whereby excellent shock resistance can be maintained.

Therefore, using such a method for producing an optical article, an optical article that allows the suppression of interference fringes and also exhibits excellent shock resistance (shock absorption) can be provided.

In accordance with the aspect of the invention, a second layer having a refractive index lower than that of the plastic substrate may be laminated on the first layer, as mentioned above. That is, the method for producing an optical article according to the aspect of the invention may further include laminating on the first layer the second layer having a refractive index lower than that of the plastic substrate. The first layer and the second layer may be integrally fixed (formed by heating) after lamination, or may also be separately formed. At this time, in the first layer, the surface layer thereof on the side facing the second layer typically has a refractive index lower than that on the side facing the plastic substrate.

Further, in accordance with the aspect of the invention, it is preferable that the metal oxide particulates have an average particle diameter of 5 nm to 60 nm. In this way, the first layer can be provided with a further increased refractive index in the vicinity of the plastic substrate. As a result, even when using a high-refractive-index plastic substrate having a refractive index of 1.7 or more, the formation of interference fringes can be effectively suppressed.

With respect to the first composition that includes different kinds of polyurethane resins, an example of a combination that easily provides a varying refractive index and shock absorption is a combination including a polyurethane resin having an average particle diameter equal to or smaller than the average particle diameter of the metal oxide and a polyurethane resin having an average particle diameter equal to or larger than the average particle diameter of the metal oxide. In terms of compatibility in the first composition, a polyurethane resin having an average particle diameter equal to or smaller than the average particle diameter of the metal oxide is preferable. Meanwhile, in order to secure excellent shock resistance, the flexibility of the first layer needs to be ensured to some extent or the thickness of the first layer needs to be ensured to some extent, and thus a polyurethane resin having an average particle diameter equal to or larger than the average particle diameter of the metal oxide is preferable. In order to secure excellent shock resistance, the combination of different kinds of polyurethane resins preferably further includes a polyurethane resin having an average particle diameter larger than the average particle diameter of the metal oxide.

Therefore, in accordance with the aspect of the invention, it is preferable that the first polyurethane resin has an average particle diameter of 5 nm to 40 nm, and that the second polyurethane resin has an average particle diameter of 40 nm to 400 nm. It is even more preferable that the first polyurethane resin has an average particle diameter of 20 nm to 40 nm, and that the second polyurethane resin has an average particle diameter of 60 nm to 400 nm.

In addition, in accordance with the aspect of the invention, it is preferable that the first composition further includes: (A3) a third polyurethane resin having an average particle diameter of 40 nm to 60 nm and containing a carbonate backbone.

The third polyurethane resin having an average particle, diameter of 40 nm to 60 nm and containing a carbonate backbone has a relatively high compatibility with the metal oxide particulates. The third polyurethane resin thus fills voids in the first layer well. Therefore, the third polyurethane resin is expected to moderately mitigate the amount of hard segments, and also contribute to the provision of the first layer with a high, gradient refractive index.

By using the second polyurethane resin having a relatively large average particle diameter, the flexibility of the first layer can be developed, or the first layer can be formed relatively thick. Further, the second polyurethane resin having a relatively large average particle diameter is less likely to interfere with the movement of the metal oxide particulates. If the movement of the metal oxide particulates is inhibited, then it will be difficult to form the first layer having a refractive index decreasing continuously or stepwise in the direction away from the plastic substrate. When the average particle diameter of the second polyurethane resin is more than 400 nm, such a resin is difficult to well mix with or disperse in the metal oxide particulates, the first polyurethane resin, and/or the third polyurethane resin, which have small particle diameters, making it difficult to provide the first layer with a uniform resin composition.

Therefore, when the first composition includes the first polyurethane resin having an average particle diameter of 20 nm to 40 nm, the second polyurethane resin having an average particle diameter of 60 nm to 400 nm, and the third polyurethane resin having an average particle diameter of 40 nm to 60 nm, this allows the first layer to be a layer with a relatively high flexibility or to be a relatively thick layer, and further, this also provides the layer with a refractive index decreasing continuously or stepwise in the direction away from the plastic substrate. In addition, the stability of the first composition as a mixture can also be well maintained.

In accordance with the aspect of the invention, the first layer can be laminated by any of various methods, such as dipping (dip coating method), spin coating (spin coating method), spray coating (spray method), roll coating, and flow coating. In the light of simplicity in operations, etc., a dip coating method is preferable.

Therefore, the method for producing an optical article according to the aspect of the invention preferably includes immersing the plastic substrate in the first composition to apply the first composition to the plastic substrate.

Another aspect of the invention provides an optical article having a first layer formed on a plastic substrate. In accordance with the aspect of the invention, the first layer has a refractive index decreasing in the direction away from the plastic substrate, and the optical article is formed using a first composition that includes: (A1) a first polyurethane resin containing an aromatic ring, (A2) a second polyurethane resin containing a carbonate backbone, (B) metal oxide particulates, and (C) an organosilicon compound. As a result, even in the case of using a high-refractive-index plastic substrate, the shock resistance of the optical article is excellent, and further, the formation of interference fringes can be suppressed.

In accordance with the aspect of the invention, a second layer having a refractive index lower than that of the plastic substrate may be formed on the first layer. This also discourages the formation of interference fringes.

In accordance with the aspect of the invention, it is preferable that the first polyurethane resin has an average particle diameter $d1$ that satisfies the following conditional expression (1-1), the second polyurethane resin has an average particle diameter $d2$ that satisfies the following conditional expression (2-1), and the metal oxide particulates have an average particle diameter $dm$ that satisfies the following conditional expression (3).

$$5\ nm \leq d1 \leq 40\ nm \tag{1-1}$$

$$40\ nm \leq d2 \leq 400\ nm \tag{2-1}$$

$$5\ nm \leq dm \leq 60\ nm \tag{3}$$

When the metal oxide, particulates have an average particle diameter dm that satisfies the conditional expression (3), the first layer can be provided with an increased refractive index in the vicinity of the plastic substrate. Further, because the first composition includes the first polyurethane resin that satisfies the conditional expression (1-1) and the second polyurethane resin that satisfies the conditional expression (2-1), use of such a first composition provides the first layer as a layer that is relatively thick; exhibits excellent shock absorption, and has a refractive index decreasing (gradient) continuously or stepwise in the direction away from the plastic substrate.

It is more preferable that the average particle diameter d1 of the first polyurethane resin satisfies the following conditional expression (1-2) and the average particle diameter d2 of the second polyurethane resin satisfies the following conditional expression (2-2). In addition, it is also more preferable that the first composition further includes a third polyurethane resin (A3) that contains a carbonate backbone and has an average particle diameter d3 that satisfies the following conditional expression (4).

$$20 \text{ nm} \leq d1 \leq 40 \text{ nm} \tag{1-2}$$

$$60 \text{ nm} \leq d2 \leq 400 \text{ nm} \tag{2-2}$$

$$40 \text{ nm} \leq d3 \leq 60 \text{ nm} \tag{4}$$

This provides the first layer as a layer that is relatively thick, exhibits excellent shock absorption, and has a refractive index decreasing (gradient) continuously or stepwise in the direction away from the plastic substrate. In addition, together with the second polyurethane resin, the third polyurethane resin moderately mitigates the amount of hard segments and also fills voids in the first layer well.

According to the aspects of the invention related to an optical article and a method for producing the same, the plastic substrate is obtained by polymerizing and curing a polymerizable composition primarily containing an episulfide compound, and has a refractive index of 1.7 or more. Such an optical article has a high refractive index of 1.7 or more, and a reduction in the thickness thereof can thus be easily achieved. Further, the optical article has excellent shock resistance, and also, interference fringes are hardly formed. Therefore, the aspects of the invention enable the provision of optical articles widely applicable as spectacle lenses or other various thin optical lenses such as camera lenses, lenses for telescopes, lenses for microscopes, condensing lenses for steppers, etc.

BRIEF DESCRIPTION OF THE DRAWINGS

The invention will be described with reference to the accompanying drawings, wherein like numbers reference like elements.

FIG. 1 shows a sectional view of a plastic lens according to an embodiment of the invention.

FIG. 2 shows a summary of production conditions for plastic lenses of Examples 1 to 5 and Comparative Examples 1 and 2, and the results of evaluation thereof.

DESCRIPTION OF EXEMPLARY EMBODIMENTS

Hereafter, an embodiment will be described for an optical article of the invention. FIG. 1 schematically shows an optical article according to one embodiment of the invention. The optical article 1 according to the embodiment is a spectacle lens (plastic lens for spectacles), for example.

The plastic lens 1 according to the embodiment has a plastic lens substrate 10, a first layer 11 that is formed on the surface of the plastic lens substrate 10 and is in contact with the plastic lens substrate 10, and a second layer 12 that is formed on the surface of the first layer 11 and is in contact with the first layer 11. The plastic lens 1 according to the embodiment is a spectacle lens, and thus further has an antireflection layer 13 that is formed on the surface of the second layer 12 and is in contact with the second layer 12. Further, an antifouling layer or the like may also be provided on the surface of the antireflection layer 13.

In the optical article 1 according to the embodiment, the first layer 11 is a layer that functions as a so-called primer layer, and the second layer 12 is a layer that functions as a so-called hard coating layer. Hereinafter, the first layer 11 will be referred to as a primer layer, and the second layer will be referred to as a hard coating layer. Next, the plastic lens substrate 10, the primer layer 11, and the hard coating layer 12 will be each explained in further detail.

1. Plastic Lens Substrate

The plastic lens substrate 10 is not limited insofar as it is made of plastic resin or is primarily made of plastic resin. When the optical article 1 is a spectacle lens (plastic lens for spectacles), a lens material with a high refractive index is preferably used as the plastic lens substrate 10 in order to provide the optical article 1 with reduced thickness and also to create a difference in refractive index from the antireflection layer 13 to be formed as an upper layer above the surface of the plastic lens substrate 10. The refractive index of the plastic lens substrate 10 for spectacle lenses is preferably 1.65 or more, more preferably 1.7 or more, still more preferably 1.74 or more, and most preferably 1.76 or more.

Examples of lens materials having a refractive index of 1.65 or more are polythiourethane-based plastics produced by reacting a compound containing an isocyanate group or an isothiocyanate group with a compound containing a mercapto group, episulfide-based plastics produced by polymerizing and curing a raw material monomer having a compound containing an episulfide group, and the like.

The compound containing an isocyanate group or an isothiocyanate group, which serves as the main component of a polythiourethane-based plastic, may be a publicly known compound. Specific examples of compounds containing an isocyanate group include ethylene diisocyanate, trimethylene diisocyanate, 2,4,4-trimethylhexane diisocyanate, hexamethylene diisocyanate, and m-xylylene diisocyanate.

The compound containing a mercapto group may also be a publicly known compound. Specific examples of compounds containing a mercapto group include aliphatic polythiols such as 1,2-ethanedithiol, 1,6-hexanedithiol and 1,1-cyclohexanedithiol, and aromatic polythiols such as 1,2-dimercaptobenzene and 1,2,3-tris(mercaptomethyl)benzene.

Further, in order to provide the plastic lens substrate 10 with a high refractive index, a polythiol containing a sulfur atom in addition to a mercapto group is more preferably used. Specific examples thereof include 1,2-bis(mercaptomethylthio)benzene, 1,2,3-tris(mercaptoethylthio)benzene, and 1,2-bis((2-mercaptoethyl)thio)-3-mercaptopropane.

As the plastic lens substrate 10, one that is obtained by polymerizing and curing a polymerizable composition primarily containing an episulfide compound and thus has a refractive index of 1.7 or more, preferably more than 1.7, is also suitable.

As the episulfide compound, a known episulfide-group-containing compound can be used without any limitation.

Specific examples of episulfide compounds include those obtained by partially or totally substituting the oxygen of an epoxy group of an existing epoxy compound with sulfur. Further, in order to provide the plastic lens substrate 10 with a high refractive index, it is preferable to use a compound containing a sulfur atom in addition to an episulfide group. Specific examples thereof include 1,2-bis (β-epithiopropylthio) ethane, bis-(β-epithiopropyl) sulfide, 1,4-bis(β-epithiopropylthiomethyl)benzene, 2,5-bis(β-epithiopropylthiomethyl)-1,4-dithian, and bis-(β-epithiopropyl)disulfide. These episulfide compounds may be used singly or in mixture.

The plastic lens substrate 10 can be obtained, for example, by mixing the above-mentioned episulfide compound as a monomer with a given catalyst, optionally together with sulfur, and then injecting the mixture into a glass or metal mold, followed by so-called cast polymerization. By performing polymerization in the presence of sulfur, a high-refractive-index plastic lens substrate 10 with a refractive index of 1.74 or more can be provided. In the case where sulfur is mixed, the amount of sulfur is preferably 0.1 to 25 parts by weight, more preferably 1 to 20 parts by weight, relative to 100 parts by weight of the episulfide compound.

Examples of catalysts used for polymerization include amines, phosphines, quaternary ammonium salts, quaternary phosphonium salts, tertiary sulfonium salts, secondary iodonium salts, mineral acids, Lewis acids, organic acids, silicic acids, and tetrafluoride borates. Among these, preferred catalysts are, for example, amines such as aminoethanol and 1-aminopropanol, quaternary ammonium salts such as tetrabutylammonium bromide, quaternary phosphonium salts such as tetramethylphosphonium chloride and tetramethylphosphonium bromide, and the like.

Further, the catalyst used for polymerization is selected according to the kind of monomer to be used, and the amount to be added should also be adjusted. Typically, the amount is preferably within a range of 0.001 to 0.1 wt % based on the total amount of the raw material for the plastic lens substrate 10.

The polymerization temperature is preferably about 5 to about 120° C., and the reaction time is about 1 to about 72 hours. After polymerization, annealing is preferably performed at 50 to 150° C. for about 10 minutes to about 5 hours to remove distortion of the plastic lens substrate 10.

In the preparation of the polymerizable composition for forming the plastic lens substrate 10, it is also preferable to add a polyisocyanate compound and/or a polythiol compound therewith as an additional monomer. When a polyisocyanate compound and/or a polythiol compound is further mixed with the episulfide compound, not only the episulfide compound but also the polyisocyanate compound or the polythiol compound is involved in polymerization. As a result, the plastic lens substrate 10 can be provided with further improved dye affinity and heat resistance.

If necessary, the polymerizable composition for forming the plastic lens substrate 10 may further have any known additives such as UV absorbers, infrared absorbers, light stabilizers, internal release, agents, antioxidants, dyes, photochromic dyes, pigments, and antistatic agents.

2. Primer Layer

The primer layer 11 is formed by applying a first composition (composition for forming a primer layer) directly onto the plastic lens substrate 10, followed by thermal fixing with the hard coating layer 12. The primer layer 11 and the hard coating layer 12 may also be formed independently by thermal fixing. The primer layer 11 may be formed, for example, by dipping (dip coating method), spin coating (spin coating method), spray coating (spray method), roll coating, flow coating, or the like.

Typically, the primer layer 11 has the properties of improving the adhesion between the plastic lens substrate 10 and the hard coating layer 12 and imparting shock resistance. In addition, the primer layer 11 according to the embodiment is formed in such a manner that the refractive index thereof decreases in the direction away from the plastic lens substrate 10. More specifically, in the primer layer 11 according to the embodiment, a portion of the primer layer 11 on its plastic-lens-substrate-10 side (portion in contact with the plastic lens substrate 10 and the vicinity thereof) has an refractive index close to that of the plastic lens substrate 10, while a portion of the primer layer 11 on its hard-coating-layer-12 side (portion in contact with the hard coating layer 12 and the vicinity thereof) has an refractive index close to that of the hard coating layer 12.

Such a primer layer 11 can be formed by using a composition for forming a primer layer, the composition including: (A1) a first polyurethane resin containing an aromatic ring, (A2) a second polyurethane resin containing a carbonate backbone, (B) metal oxide particulates (metal oxide sol), and (C) a organosilicon compound. The composition for forming a primer layer preferably further includes, in addition to these components: (A3) a third polyurethane resin containing a carbonate backbone and having an average particle diameter smaller than that of the polyurethane resin (A2).

In the composition for forming a primer layer, not only the metal oxide particulates but also the different kinds of polyurethane resins and the organosilicon compound are in the form of particles. The average particle diameter of a polyurethane resin is determined, for example, by controlling the production conditions for the polyurethane resin and the molecular weight thereof, the stirring rate in the composition for forming a primer layer, or the like.

The average particle diameter of the particles (particulates) can be determined by light scattering. For example, a dynamic light-scattering particle size distribution analyzer (manufactured by HORIBA, trade name: LB-550) can be used to measure the particle size distribution and the average particle diameter.

The refractive index of the primer layer 11 formed using the composition for forming a primer layer decreases in the direction away from the plastic lens substrate 10 presumably for the following reasons. Specifically, at the time of drying the applied composition for forming a primer layer, the polyurethane resins cure relatively quickly in the surface layer. Subsequently, the polyurethane resins gradually cure inward (toward the intermediate layer) taking a greater amount of metal oxide particulates than contained in the surface layer. This provides a layer with the surface layer thereof containing a relatively large amount of polyurethane resins and the intermediate layer thereof containing a relatively large amount of metal oxide particulates. As a result, the primer layer 11 having a refractive index decreasing in the direction away from the plastic lens substrate 10 is formed.

Titanium oxide may be used as the metal oxide particulates contained in the composition for forming a primer layer. However, even when no or only a small amount of titanium oxide is used, the refractive index of the primer layer 11 can be improved, and the formation of interference fringes can also be suppressed. A reduction in the amount of titanium oxide leads to reduced photoactive properties and improved light resistance.

The composition for forming a primer layer also contains an organosilicon compound in addition to the polyurethane resins and the metal oxide particulates. In the case where no organosilicon compound is present in the composition for forming a primer layer, a simple increase in the refractive index of the metal oxide particulates or in the content thereof does not give a significant increase in the refractive index of the primer layer 11. When the composition for forming a primer layer contains an organosilicon compound together with the polyurethane resins and the metal oxide particulates, the organosilicon compound enters voids formed by the polyurethane resin particles and the metal oxide particulates. As a result, presumably, the primer layer 11 has an improved density, whereby the refractive index thereof is improved. The organosilicon compound thus presumably contributes to the improvement of refractive index. When the composition for forming a primer layer contains the organosilicon compound, voids in the primer layer 11 are filled with the organosilicon compound, whereby the intermediate layer of the primer layer 11 can be provided with a higher density.

Because the composition for forming a primer layer contains polyurethane resins (more specifically, several polyurethane resins), the primer layer 11 formed using such a composition has excellent shock resistance and also exhibits excellent adhesion between the plastic lens substrate 10 and the hard coating layer 12. In addition, the composition for forming a primer layer, which contains the polyurethane resins, is more effective in improving light resistance and shock resistance, as compared with the case of using a different resin, for example, polyester resin.

2.1 Polyurethane Resins (Component (A1), Component (A2), and Component (A3))

The polyurethane resin as Component (A1) is not limited insofar as it is a polyurethane resin containing an aromatic ring, and can be suitably selected. A preferred example of such a polyurethane resin as Component (A1) is a polyurethane resin containing an aromatic ring and also having an average particle diameter of 5 nm to 40 nm, and more preferably 20 nm to 40 nm.

The polyurethane resin as Component (A2) is not limited insofar as it is a polyurethane resin containing a carbonate backbone, and can be suitably selected. A preferred example of such a polyurethane resin as Component (A2) is a polyurethane resin containing a carbonate backbone and also having an average particle diameter of 40 nm to 400 nm, and more preferably 60 nm to 400 nm.

It is still more preferable to use, in addition to these components, the polyurethane resin as Component (A3). As the Component (A3) polyurethane resin, a polyurethane resin containing a carbonate backbone and having an average particle diameter of 40 nm to 60 nm is suitable. As mentioned above, by using the composition for forming a primer layer, which includes different kinds of polyurethane resins each having a different average particle diameter, the flexibility of the first layer can be relatively developed, and the thickness of the first layer can be relatively thick. Further, the stability of the first composition as a mixture can be well maintained. In addition, together with the second polyurethane resin, the third polyurethane resin moderately mitigates the amount of hard segments, fills voids in the first layer well, and also contributes to the provision of the primer layer 11 with a high, gradient refractive index.

By selecting polyurethane resins structured to allow the polar groups therein to attract one another, a compact structure (hard segments) can be formed. However, in the case where only polyurethane resins having a relatively large average particle diameter are used, even when the resins are structured to allow the polar groups therein to attract one another, it may happen that a compact structure (hard segments) is not formed or is hardly formed due to a steric barrier, etc. Even in such a case, when at least one of the polyurethane resins used is a polyurethane resin containing a carbonate backbone and having a relatively small average particle diameter, voids created due to the steric barrier of the polyurethane resin containing an aromatic ring and having a relatively large average particle diameter, for example, can be filled.

An aromatic ring (e.g., benzene ring) has a highly symmetric molecular structure. When such aromatic rings gather due to polar groups attracting one another, this results in an extremely compact structure (hard segments). Therefore, it is preferable that at least one of the polyurethane resins used is a polyurethane resin containing an aromatic ring. As a result, the primer layer 11 has a higher density, and the refractive index thereof can be increased.

However, when many of the polyurethanes resins used are aromatic-ring-containing polyurethane resins, due to an increase in hard segments, the crystallinity of the resulting primer layer 11 may be extremely high, reducing the shock resistance thereof. In such a case, it is preferable that at least one of the polyurethane resins used is a carbonate-based polyurethane resin (polyurethane resin containing a carbonate backbone). Use of a carbonate-based polyurethane resin (polyurethane resin containing a carbonate backbone) can moderately mitigate the amount of hard segments.

Therefore, the primer layer 11 that has a relatively high refractive index and also exhibits excellent shock resistance can be formed by using the composition for forming a primer layer, which includes the first polyurethane resin that contains an aromatic ring and has a first average particle diameter and the second polyurethane resin that contains a carbonate backbone and has a second average particle diameter. Further, by additionally using the third polyurethane resin containing a carbonate backbone and having an average particle diameter of 40 nm to 60 nm, the amount of hard segments is moderately mitigated, and voids in the first layer are filled well, providing the primer layer 11 with a high, gradient refractive index.

As the polyurethane resin (A1) or (A3), a water-soluble polyurethane resin or a water-dispersible polyurethane resin obtained by reacting a diisocyanate compound with a diol compound (polyurethane water dispersion) can be advantageously used, for example. A water-dispersible polyurethane resin is more preferable.

Examples of diisocyanate compounds include alicyclic diisocyanate compounds such as hexamethylene diisocyanate, 2,2,4-trimethylhexamethylene diisocyanate, hydrogenerated xylylene diisocyanate, 1,4-cyclohexane diisocyanate, and 4,4-dicyclohexylmethane diisocyanate; araliphatic diisocyanate compounds such as xylylene diisocyanate and tetramethylxylylene diisocyanate; aromatic diisocyanate compounds such as toluylene diisocyanate and phenylmethane diisocyanate; and, modifications of these diisocyanates (carbodiimide-, uretdione-, or uretonimine-containing modifications, etc). Other known diisocyanate compounds are also usable.

An example of a diol compound is one obtained by (co)polymerizing an alkylene oxide, such as ethylene oxide or propylene oxide, and/or a heterocyclic ether, such as tetrahydrofuran. Specific examples of diol compounds include polyether diols such as polyethylene glycol, polypropylene glycol, polytetramethylene ether glycol, and polyhexamethylene ether glycol; polyester diols such as polyethylene adipate, polybutylene adipate, polyneopentyl adipate, poly-3-methylpentyl adipate, polyethylene/butylene adipate, and polyneopentyl/hexyl adipate; polylactone diols such as polycaprolactone diol; and polycarbonate diols. Among these, at least one kind of polyether diol, polyester diol, or polycarbonate diol is preferably used as the diol compound. Other known diol compounds are also usable.

Further, a polyether-based polyurethane resin, a polyester-based polyurethane resin, or a polycarbonate-based polyurethane resin obtained using as the diol compound a polyether diol, a polyester diol, or a polycarbonate diol is preferably used as the polyurethane resin.

In addition, it is also desirable to use a diol containing an acidic group, such as a carboxylic acid group or a sulfonic acid group, or to use a urethane resin to which a low-molecular-weight polyhydroxy compound has been added or into which an acidic group has been introduced, especially a urethane resin containing a carboxyl group. Further, for improving gloss, scratch resistance, etc., crosslinking is preferably performed to cross-link carboxyl groups or like functional groups.

As the polyurethane resin (A2), a water-soluble or water-dispersible polyurethane resin (polyurethane water dispersion) obtained by a polymerization reaction of an active-hydrogen-containing compound with a polyisocyanate compound is suitable, for example.

Examples of active-hydrogen-containing compounds include alkylene glycols such as ethylene glycol, 1,2-propylene glycol, 1,3-butanediol, 1,4-butanediol, 1,6-hexanediol, neopentyl glycol, dipropylene glycol, and diethylene glycol; polyalkylene glycols such as polypropylene glycol, polyethylene glycol, and polytetramethylene glycol; poly(alkylene adipates) such as poly(diethylene adipate), poly(tetramethylene adipate), poly(hexamethylene adipate), and poly(neopentylene adipate); polybutadiene glycols such as poly-ε-caprolactone, poly(1,4-butanediene)glycol, and poly(1,2-butanediene)glycol; poly(alkylene carbonates) such as poly(hexamethylene carbonate); and silicone polyols. Other known active-hydrogen-containing compounds are also usable.

Examples of polyisocyanate compounds include aromatic diisocyanates such as tolylene diisocyanate, xylylene diisocyanate, 4,4'-diphenylmethane diisocyanate, 1,5-naphthalene diisocyanate, and 3,3'-dimethyl-4,4'-diphenyl diisocyanate; and aliphatic diisocyanates such as 1,6-hexamethylene diisocyanate, isophorone diisocyanate, 4,4'-dicyclohexylmethane diisocyanate, 1,3-bis(isocyanatomethyl)cyclohexane, and trimethylhexamethylene diisocyanate.

Further, as polyisocyanate compounds, so-called blocked polyisocyanates are also usable, examples thereof including hydrogenated xylylene diisocyanate, a biuret or isocyanurate of hexamethylene diisocyanate, a reaction adduct of hexamethylene diisocyanate and trimethylolpropane, 2-isocyanatoethyl-2,6-diisocyanate hexanoate, 1,6,11-undecane triisocyanate, a reaction adduct of isophorone diisocyanate and trimethylolpropane, a reaction adduct of xylylene diisocyanate and trimethylolpropane, and a reaction adduct of bis(isocyanate methyl)cyclohexane and trimethylolpropane. Other known polyisocyanate compounds are also usable.

For developing shock resistance, a preferred polyurethane resin is a polyurethane resin containing a carbonate backbone and having a combination of poly(hexamethylene carbonate) or a like polycarbonate-based polyol as the active-hydrogen-containing compound with isophorone diisocyanate, 4,4'-dicyclohexylmethane diisocyanate, 1,3-bis(isocyanatomethyl) cyclohexane, trimethylhexamethylene diisocyanate, or a like aliphatic and/or alicyclic diisocyanate as the polyisocyanate compound.

When a polyurethane resin contains an isophorone group, a dicyclohexyl group, or the like having a bulky structure to provide steric hindrance, such a resin has improved mechanical stability, allows the formation of a layer having excellent flexibility, and also exhibits excellent shock resistance. In addition, as compared with the polyester backbone or polyether backbone in common use, the carbonate backbone is capable of developing hydrolysis resistance, and thus allows the formation of a coating with excellent durability.

For developing a high refractive index, the polyurethane resin (A2) preferably contains an aromatic ring together with a carbonate backbone. Thus, the polyurethane resin (A2) is preferably a polyurethane resin having a combination of a polyester-based polyol and/or a polyether-based polyol as the active hydrogen compound with an aromatic isocyanate as the polyisocyanate compound. A polyurethane resin containing an aromatic ring develops a high refractive index, and thus is preferable. Further, a polyurethane resin containing an aromatic ring provides high crystallinity, and can thus improve transparency.

Combined use of a polyurethane resin containing a carbonate backbone with a polyurethane resin containing an aromatic ring makes it possible to provide the primer layer with shock resistance, a high refractive index, and excellent transparency. At this time, by using, as such polyurethane resins, a combination of polyurethane resins each having a different average particle diameter, the primer layer is provided with dense filling, and accordingly, the shock resistance and the refractive index are further improved than in the case where the resins are used independently. That is, a combination of 2 or more kinds of polyurethane resins each having a different particle diameter allows the improvement of shock resistance, refractive index, and transparency.

Accordingly, for developing excellent shock resistance, a high-molecular-weight polyurethane resin is preferable as the polyurethane resin containing a carbonate backbone, and one having a relatively large average particle diameter is preferably combined. Meanwhile, as the polyurethane resin containing an aromatic ring, one having a relatively small average particle diameter is preferably combined in order to develop a high refractive index and transparency and also to develop shock resistance by moderately compensating for voids in the matrix created due to the polyurethane resin containing a carbonate backbone and having a relatively large average particle diameter.

The form of a polyurethane resin is not limited. Typical examples are self-emulsion or like emulsion resins and self-stabilizing resins. In the preparation of the composition for forming a primer layer, the polyurethane resins are preferably used in the form of polyurethane solutions, for example. Such a polyurethane solution may contain a mixture of unpolymerized compounds, such as a mixture of an active-hydrogen-containing compound and a polyisocyanate, and may also contain a polymerized product.

For sufficiently developing a refractive index gradient function, the polyurethane solution preferably contains a polymerized product. Examples of polyurethane solutions containing a polymerized product are a water-soluble or self-dispersing, polyurethane water-dispersed emulsion obtained by adding a hydrophilic group or a hydrophilic segment to a polyurethane resin, a polyurethane emulsion obtained by forcibly emulsifying a hydrophobic urethane resin using a surfactant, and the like. When the composition for forming a primer layer prepared using such polyurethane solutions is applied to the surface of the plastic lens substrate 10 and dried to cure, because of a fusion reaction between the polyurethane resins, the composition for forming a primer layer exhibits excellent long-term stability, and at the same time, the primer layer 11 can be provided with excellent coating uniformity.

Examples of applicable polyurethane resins include cationic urethane resins, anionic urethane resins, amphoteric urethane resins, nonionic urethane resins, and like polyurethane resins. Among these, considering the compatibility with the below-mentioned metal oxide particulates, and in view of maintaining the stability of the whole composition for forming a primer layer, an anionic urethane resin is preferably used.

The amount of polyurethane resins (proportion of the total amount of the polyurethane resins in the composition for forming a primer layer) is preferably within a range of 20 to 70 wt %, and more preferably 40 to 60 wt %. In the case where the optical article 1 is a spectacle lens as in this embodiment, when the amount of polyurethane resins is less than 20 wt %, the final optical article 1 may have insufficient shock resistance or light resistance. Further, when the amount of polyurethane resins is more than 70 wt %, the resulting primer layer 11 has a reduced refractive index, and interference fringes are thus more likely to be formed. Further, in the case where the optical article 1 is a spectacle lens, the appearance of the spectacle lens 1 may be degraded.

Specific examples of preferred polyurethane resins include Superflex 210 (manufactured by DAI-ICHI KOGYO SEIYAKU), Superflex 460 (manufactured by DAI-ICHI KOGYO SEIYAKU), F2929D (manufactured by DAI-ICHI KOGYO SEIYAKU), NeoRez R-960 (manufactured by ZENECA), Hydran AP-30 (manufactured by DAINIPPON INK), Izelax S-1020 (manufactured by HODOGAYA CHEMICAL), Neotan UE-5000 (manufactured by TOAGOSEI), RU-40 series (manufactured by STAHL JAPAN), WF-41 series (manufactured by STAHL JAPAN), and WPC-101 (manufactured by Nippon Polyurethane Industry).

2.2 Metal Oxide Particulates (Component (B))

The metal oxide particulates, Component (B), contribute to the refractive index of the primer layer 11, and also serve as a filler to improve the crosslinking density of the primer layer 11, contributing to the improvement of water resistance, weatherability, and light resistance.

The metal oxide particulates are preferably particulates containing titanium oxide, and are more preferably metal oxide particulates primarily containing titanium oxide having a rutile crystal structure. In terms of light resistance, it is more preferable to use composite particulates containing titanium oxide having a rutile crystal structure. Examples of composite metal oxide particulates include particulates of titanium oxide/tin oxide or titanium oxide/tin oxide/silicon oxide having a rutile crystal structure.

Use of composite oxide particulates containing titanium oxide having a rutile crystal structure as the metal oxide particulates not only improves the refractive index of the primer layer 11, but also improves the weatherability and the light resistance thereof. Rutile crystals provide a higher refractive index than provided by anatase crystals. Therefore, it can be said that the composite oxide particulates containing titanium oxide having a rutile crystal structure are metal oxide particulates with a relatively high refractive index.

The surface of metal oxide particulates is preferably treated with an organosilicon compound containing a methyl group or like alkyl group. As the organosilicon compound containing an alkyl group, among organosilicon compounds for use as the below-mentioned Component (C), one having an alkyl group is suitable.

Use of the metal oxide particulates surface-treated with an organosilicon compound containing an alkyl group improves the compatibility with the polyurethane resins as Component (A), thereby improving uniformity. As a result, the formation of interference fringes is suppressed, and shock resistance is also improved. Further, when the uniformity of the primer layer 11 is improved, the uniformity of voids to be filled with the organosilicon compound as Component (C) is also improved simultaneously. As a result, the refractive index of the primer layer 11 is further improved, whereby the formation of interferemce fringes can be suppressed more effectively.

The kind and amount of metal oxide particulates are determined depending on the intended refractive index, hardness, and the like. The metal oxide particulates preferably have an average particle diameter of 5 nm to 60 nm, and more preferably 10 to 20 nm. When the average particle diameter of the metal oxide particulates is less than 5 nm or more than 60 nm, it may happen that synergistic effects with the polyurethane resins as Component (A) or the organosilicon compound as the below-mentioned Component (C) are not well exhibited, making it difficult to effectively improve the refractive index of the primer layer 11.

The amount of metal oxide particulates (proportion of metal oxide particulates in the composition for forming a primer layer) is preferably 30 to 80 wt %, and more preferably within a range of 40 to 60 wt %. When the amount of metal oxide particulates is too small, the resulting primer layer 11 may have insufficient refractive index or abrasion resistance. Meanwhile, when the amount of metal oxide particulates is too large, this may reduce the shock resistance or may cause cracks in the resulting primer layer 11. In addition, in the case where dyeing is employed, the dye affinity may also be reduced. When the proportion of metal oxide particulates is 30 to 80 wt %, the resulting primer layer 11 has a sufficiently high refractive index, and also the crosslinking density of the primer layer 11 can be moderately maintained, without impairing the hardness or the shock resistance thereof.

2.3 Organosilicon Compound (Component (C))

The organosilicon compound, Component (C), mainly serves to fill voids in the primer layer 11, thereby increasing the density of the entire primer layer 11, improving the refractive index thereof. As the organosilicon compound, a compound represented by the following general formula (a) is preferably used, for example:

$$R^1R^2{}_nSiX^1{}_{3-n} \qquad (a)$$

wherein $R^1$ is an organic group having a polymerizable reaction group, $R^2$ is a $C_{1-6}$ hydrocarbon group, $X^1$ is a hydrolytic group, and n is 0 or 1.

Examples of organosilicon compounds represented by the general formula (a) include vinyltrialkoxysilane, vinyltrichlorosilane, vinyltri(β-methoxy-ethoxy) silane, aryltrialkoxysilane, acryloxypropyltrialkoxysilane, methacryloxypropyltrialkoxysilane, β-(3,4-epoxycyclohexyl)-ethyltrialkoxysilane, mercaptopropyltrialkoxysilane, γ-aminopropyltrialkoxysilane, γ-glycidoxypropyltrialkoxysilane, phenyltrimethoxysilane, phenyltriethoxysilane, and diphenyldimethoxysilane. A mixture of two or more kinds of these organosilicon compounds may also be used.

Tetramethoxysilane, tetraethoxysilane, or a like tetrafunctional organosilicon compound represented by the following general formula (b) may also be used as the organosilicon compound to provide the same advantage as above:

$$SiX^2{}_4 \qquad (b)$$

wherein $X^2$ is an alkoxyl group.

Further, the organosilicon compound may also be an organosilicon compound containing an epoxy group, examples thereof including glycidoxymethyltrimethoxysilane, glycidoxymethyltriethoxysilane, α-glycidoxyethyltrimethoxysilane, α-glycidoxyethyltriethoxysilane, β-glycidoxyethyltriethoxysilane, β-glycidoxypropyltrimethoxysilane, α-glycidoxypropyltrimethoxysilane, α-glycidoxypropyltriethoxysilane, β-glycidoxypropyltriethoxysilane, γ-glycidoxypropyltrimethoxysilane, (3,4-epoxycyclohexyl)methyltrimethoxysilane, γ-glycidoxypropylvinyldiethoxysilane, γ-glycidoxypropylphenyldiethoxysilane, and δ-(3,4-epoxycyclohexyl)butyltriethoxysilane. Use of such an organosilicon compound further improves the adhesion between the plastic lens substrate 10 and the hard coating layer 12.

When the organosilicon compound contains an epoxy group, the crosslinking density of the primer layer 11 is not excessively improved and is moderately controlled, providing the primer layer 11 with excellent shock resistance.

Further, the organosilicon compound is an organoalkoxysilane compound, and can be effectively used as a non-hydrolyzed monomer. When an organoalkoxysilane compound is used as a non-hydrolyzed monomer, as compared with the case of using a hydrolyzed polymer, voids in the primer layer 11 are filled more easily. Therefore, the primer layer 11 has a higher refractive index, and even when using an episulfide-based plastic lens substrate 10 having a refractive index of 1.7 or more, the formation of interference fringes can be sufficiently prevented.

The organosilicon compound preferably has an average particle diameter of not more than 5 nm, and more preferably not more than 1 nm. When the average particle diameter of the organosilicon compound is more than 5 nm, it may happen that synergistic effects with the polyurethane resins or the metal oxide particulates are not exhibited, making it difficult to effectively improve the refractive index of the primer layer 11.

The amount of the organosilicon compound (proportion of the organosilicon compound in the composition for forming a primer layer) is preferably 0.1 wt % to 10 wt %. When the proportion of the organosilicon compound is less than 0.1 wt %, the adhesion between the plastic lens substrate 10 and the hard coating layer 12 may be insufficient. Further, voids may be incompletely filled, whereby the refractive index is not improved. Meanwhile, when the proportion of the organosilicon compound is more than 10 wt %, the abrasion resistance may be reduced. Further, such an organosilicon compound is in excess relative to voids, and this may result in a reduced refractive index.

In the application of the composition for forming a primer layer to the plastic lens substrate 10, for the purpose of improving the adhesion between the plastic lens substrate 10 and the first primer layer 11, it is effective to pre-treat the surface of the plastic lens substrate 10 through alkali treatment, acid treatment, surfactant treatment, peeling/polishing treatment with inorganic or organic particulates, or plasma treatment.

The composition for forming a primer layer may be applied and cured, for example, by a method in which the composition for forming a primer layer is applied onto the plastic lens substrate 10 by dipping (dip coating method), spin coating (spin coating method), spray coating (spray method), roll coating, flow coating, or the like, and then dried by heating at a temperature of 40 to 200° C. for several hours.

If necessary, the composition for forming a primer layer may be diluted to a concentration suitable for application. Examples of solvents used for dilution include hydrocarbons, halogenated hydrocarbons, alcohols, ketones, esters, ethers, and aromatic solvents. Other known solvents are also usable. Typically, the solvent vaporizes by heating, whereby the primer layer 11 primarily having polyurethane resins and so forth is formed.

If necessary, a small amount of metal chelate compound, surfactant, antistatic agent, UV absorber, antioxidant, disperse dye, oil color, pigment, photochromic compound, hindered-amine- or hindered-phenol-based, light-resistant, heat-resistant stabilizer, or the like may be added to the composition for forming a primer layer to improve the application properties, the curing rate, the performance of a cured coating, etc.

In the following examples, the primer layer 11 consists of one layer. However, the primer layer 11 may also have a multilayer structure consisting of two or more layers. The thickness of the primer layer 11 is preferably within a range of 0.05 μm to 5 μm. The thickness is more preferably within a range of 0.1 μm to 2 μm, and most preferably within a range of 0.3 μm to 0.9 μm. When the primer layer 11 is too thin, such a layer may have reduced water resistance, shock resistance, etc., whereas when too thick, this may impair the surface smoothness or cause defects in the appearance, including optical strain, white turbidity, cloudiness, etc.

By applying the above-mentioned composition for forming a primer layer to the plastic lens substrate 10, the primer layer 11 having a refractive index decreasing in the direction away from the plastic lens substrate 10 can be formed. In order to suppress interference fringes, the difference between the refractive index of the primer layer 11 in the vicinity of the plastic lens substrate 10 and the refractive index of the plastic lens substrate 10 is preferably not more than 0.01. Further, the difference between the refractive index of the surface layer of the primer layer 11 (in the vicinity of the hard coating layer) and the refractive index of the hard coating layer is also preferably not more than 0.01.

3. Hard Coating Layer

The hard coating layer 12 is formed by applying a second composition (composition for forming a hard coating layer) directly onto the primer layer 11, followed by thermal fixing with the primer layer 11. The hard coating layer 12 may also be independently thermally fixed. The hard coating layer 12 may also be formed, for example, by dipping (dip coating method), spin coating (spin coating method), spray coating (spray method), roll coating, flow coating, or the like.

Typically, the hard coating layer 12 is formed on the surface of the primer layer 11, and exhibits scratch resistance and abrasion resistance. Such a hard coating layer 12 can be formed, for example, by using a composition for forming a hard coating layer, the composition including: (D) an organosilicon compound and (E) metal oxide particulates (metal oxide sol). The composition for forming a hard coating layer may further include: (F) an additive such as a colorant, a UV absorber, or an antioxidant.

The organosilicon compound as Component (D) may be a silicone-based curable resin, for example. The organosilicon compound as Component (D) may be the same organosilicon compound as Component (C). That is, a compound represented by the general formula (a) is suitable for use as the organosilicon compound as Component (D), for example.

The organosilicon compound serves as a binding agent in the hard coating layer. In order to obtain excellent adhesion, when using a compound represented by the general formula (a), $R^2$ in the general formula (a) is preferably an epoxy group. In order to obtain excellent scratch resistance, $R^2$ in the general formula (a) is preferably a methyl group.

The metal oxide particulates as Component (E) may be the same metal oxide particulates as Component (B). The smaller the amount of the titanium oxide used, the more excellent the resulting weatherability and light resistance. In combination with the primer layer, the hard coating layer does not necessarily have to have an improved refractive index. Thus, the amount of titanium oxide used can be reduced, allowing the, improvement of weatherability and light resistance. Further, in reducing the amount of the titanium oxide used, use of a metal oxide having no photoactive properties is extremely helpful. In particular, silicon oxide has no photoactive properties, also has a higher hardness than titanium oxide, and thus allows the improvement of weatherability, light resistance, and scratch resistance.

The composition for forming a hard coating layer, which includes the organosilicon compound and the metal oxide particulates, is preferably prepared by mixing a sol having the metal oxide particulates dispersed therein with the organosilicon compound. The amount of metal oxide particulates is determined according to the hardness and the refractive index of the hard coating layer, for example, and preferably accounts for 5 wt % to 80 wt %, especially 10 wt % to 60 wt %, of the solid content of the hard coating layer. When the amount of metal oxide particulates is too small, the abrasion resistance or the refractive index of the resulting hard coating layer, 12 will be insufficient, while when the amount is too large, cracks may occur in the resulting hard coating layer 12. In addition, in the case of dyeing the hard coating layer 12, the dye affinity may be degraded.

It is extremely helpful that the composition for forming a hard coating layer contains, in addition to the organosilicon compound as Component (D) and the metal oxide particulates as Component (E), a polyfunctional epoxy compound as an organic resin component (Component (G)). The polyfunctional epoxy compound improves the adhesion of the hard coating layer 12 to the primer layer 11, and also improves the water resistance of the hard coating layer 12 and the shock resistance of the plastic lens 1.

Examples of polyfunctional epoxy compounds include aliphatic epoxy compounds such as 1,6-hexanediol diglycidyl ether and ethylene glycol diglycidyl ether; alicyclic epoxy compounds such as isophoronediol diglycidyl ether and bis-2,2-hydroxycyclohexylpropane diglycidyl ether; and aromatic epoxy compounds such as resorcinol diglycidyl ether, bisphenol A diglycidyl ether, and cresol novolac polyglycidyl ether.

Further, a curing catalyst may be added as Component (H) to the composition for forming a hard coating layer. Examples of curing catalysts for use as Component (H) include perchloric acids such as perchloric acid, ammonium perchlorate and magnesium perchlorate, acetylacetonates whose central metal atoms are Cu (II), Zn (II), Co (II), Ni (II), Be (II), Ce (III), Ta (III), Ti (III), Mn (III), La (III), Cr (III), V (III), Co (III), Fe (III), Al (III), Ce (IV) Zr (IV), V (IV), etc., amines, amino acids such as glycine, Lewis acids, and organic acid metal salts.

The composition for forming a hard coating layer may be applied and cured, for example, by a method in which the composition for a hard coating layer is applied onto the primer layer 11 by dipping (dip coating method), spin coating (spin coating method), spray coating (spray method), roll coating, flow coating, or the like, and then dried by heating at a temperature of 40 to 200° C. for several hours.

If necessary, the composition for forming a hard coating layer may be diluted to a concentration suitable for application. Examples of solvents used for dilution include alcohols, ketones, esters, ethers, and aromatic solvents. Further, if necessary, a small amount of metal chelate compound, surfactant, antistatic agent, UV absorber, antioxidant, disperse dye, oil color, pigment, photochromic compound, hindered-amine- or hindered-phenol-based, light-resistant, heat-resistant stabilizer, or the like may be added to the coating composition for forming a hard coating layer to improve the application properties and the curing rate of the coating liquid and also improve the performance of a cured coating.

The thickness of the hard coating layer 12 is preferably within a range of 0.05 μm to 30 μm. When the thickness of the hard coating layer 12 is less than 0.05 μm, the basic performance (scratch resistance, abrasion resistance, etc.) cannot be achieved. Meanwhile, when the thickness of the hard coating layer 12 is more than 30 μm, the surface smoothness may be degraded, or optical distortion may occur.

4. Antireflection Layer

An antireflection layer 13 is a thin layer that is formed on the hard coating layer 12 as required. The antireflection layer 13 may be formed, for example, by alternately laminating a low-refractive-index layer with a refractive index of 1.3 to 1.5 and a high-refractive-index layer with a refractive index of 1.8 to 2.3. The number of layers is preferably five or seven, for example.

Example of inorganic substances used for layers that form the antireflection layer 13 include $SiO_2$, SiO, $ZrO_2$, $TiO_2$, TiO, $Ti_2O_3$, $Ti_2O_5$, $Al_2O_3$, $TaO_2$, $Ta_2O_5$, NbO, $Nb_2O_3$, $NbO_2$, $Nb_2O_5$ $CeO_2$, MgO, $Y_2O_3$, $SnO_2$, $MgF_2$, and $WO_3$. These inorganic substances are used singly, or alternatively, two or more kinds are used in mixture. An example of the antireflection layer 13 is one having a $SiO_2$ layer as the low-refractive-index layer and a $ZrO_2$ layer as the high-refractive-index layer.

Examples of methods for forming the antireflection layer 13 include dry methods, such as vacuum deposition, ion plating, and sputtering. As vacuum deposition, it is also possible to employ ion-beam-assisted deposition, in which an ion beam is applied simultaneously during vacuum evaporation.

The antireflection layer 13 may also be formed using a wet method. For example, the layer may be formed by applying a composition for forming an antireflection layer, which contains silica-based particulates having an inner cavity (hereinafter sometimes referred to as "hollow silica-based particulates") and an organic silicon compound, in the same manner as in the formation of the primer layer 11 and the hard coating layer 12.

The reason for using the hollow silica-based particulates is as follows. The inner cavity thereof contains a gas or solvent having a lower refractive index than that of silica, whereby the particulates have a reduced refractive index as compared with silica-based particulates having no cavity, and as a result, excellent antireflection effects can be imparted. Hollow silica-based particulates can be produced, for example, by a method described in JP-A-2001-233611, and those having an average particle diameter within a range of 1 to 150 nm and a refractive index within a range of 1.16 to 1.39 are preferably used. As the organosilicon compound, a compound represented by the general formula (a) is suitable. The antireflection layer 13 preferably has a thickness within a range of 50 to 150 nm. When the thickness is larger or smaller than the range, this may provide insufficient antireflection effects.

5. Antifouling Layer

For the purpose of improving the water-repellent and oil-repellent properties of the surface of the optical article 1, an antifouling layer having a fluorine-containing organosilicon compound may be formed on the antireflection layer 13. As such fluorine-containing organosilicon compounds, fluorine-containing silane compounds described in JP-A-2005-301208 and JP-A-2006-126782 are suitable, for example.

A fluorine-containing silane compound is preferably dissolved in an organic solvent to a prescribed concentration and used as a water-repellent processed liquid (composition for forming an antifouling layer). The antifouling layer can be formed by applying the water-repellent processed liquid onto the antireflection layer 13. The coating method therefor may be dipping, spin coating, or the like. In addition, it is also possible to charge the water-repellent processed liquid into metal pellets, and then form the antifouling layer using vacuum deposition or a like dry method.

The thickness of the antifouling layer is not limited, and is preferably 0.001 µm to 0.5 µm, and more preferably 0.001 µm to 0.03 µm. When the antifouling layer is too thin, this results in poor water-repellent and oil-repellent effects, while when the layer is too thick, the resulting surface is sticky, so both cases are undesirable. Further, when the thickness of the antifouling layer exceeds 0.03 µm, the antireflection effects may be impaired.

According to this embodiment, a high-refractive-index plastic substrate 10 having a refractive index of 1.7 or more can be used. Further, because the plastic substrate 10 has formed thereon the primer layer 11 and the hard coating layer 12, the optical article (spectacle plastic lens) 1 that is extremely thin, has excellent shock resistance, and exhibits less interference fringes can be provided.

EXAMPLES

Hereinafter, Examples 1 to 5 based on the above-mentioned embodiment and Comparative Examples 1 and 2 will be explained. First, methods for producing plastic lenses of Examples 1 to 5 and Comparative Examples 1 and 2 will be explained. The plastic lenses produced in Examples 1 to 5 and Comparative Examples 1 and 2 were evaluated for interference fringes, shock resistance, and haze. Evaluation criteria therefor and the obtained evaluation results will be explained.

Example 1

Step 1: Preparation of Primer Composition (First Composition)

Into a container made of stainless steel, 8500 parts by weight of methyl alcohol and 40 parts by weight of an aqueous 0.1N sodium hydroxide solution were placed, and thoroughly stirred. Subsequently, 2500 parts by weight of a composite particulate sol primarily containing titanium oxide, tin oxide, and silicon oxide (metal oxide particulates (rutile crystal structure, methanol dispersion, surface treating agent: methyltrimethoxysilane, solid content: 20%, manufactured by JGC CATALYSTS AND CHEMICALS, trade name: Optolake)) (Component (B)) was added thereto, and stir-mixed. To the mixture were added 240 parts by weight of a first polyurethane resin (Component (A1), average particle diameter: 30 nm, water dispersion, solid content: 35%, manufactured by DAI-ICHI KOGYO SEIYAKU, trade name: Superflex 210), 110 parts by weight of a third polyurethane resin (Component (A3), average particle diameter: 50 nm, water dispersion, solid content: 38%, manufactured by DAI-ICHI KOGYO SEIYAKU, trade name: Superflex 460), and 560 parts by weight of a second polyurethane resin (Component (A2), average particle diameter: 250 nm, water dispersion, solid content: 30%, manufactured by DAT-ICHI KOGYO SEIYAKU, F2929D), and 60 parts by weight of γ-glycidoxypropyltrimethoxysilane (organosilicon compound) (Component (C)), followed by stir-mixing. Subsequently, 2 parts by weight of a silicone-based surfactant (manufactured by DOW CORNING TORAY, trade name: L-7604) was further added thereto, and stirred for a whole day and night. The mixture was then filtered through a 2-µm filter to give a primer composition (first composition).

Superflex 210 is a liquid containing as a dispersion (dispersoid) an ester-based polyurethane resin containing an aromatic ring, while Superflex 460 is a liquid containing as a dispersion (dispersoid) a carbonate-based polyurethane resin containing a carbonate backbone. F2929D is a carbonate-based polyurethane resin containing a carbonate backbone and an aromatic ring, and is a liquid containing as a dispersion (dispersoid) a high-molecular-weight polyurethane resin having a relatively high refractive index.

Step 2: Preparation of Hard-Coating Composition

Into a container made of stainless steel, 1000 parts by weight of butyl cellosolve was placed, and 1200 parts by weight of γ-glycidoxypropyltrimethoxysilane was added thereto. The mixture was thoroughly stirred. Subsequently, 300 parts by weight of a 0.1 mol/l aqueous hydrochloric acid solution was added thereto and stirred for a whole day and night to give a silane hydrolysate. To the silane hydrolysate was added 30 parts by weight of a silicone-based surfactant (manufactured by DOW CORNING TORAY, trade name: L-7001), followed by stirring for 1 hour. Subsequently, 7300 parts by weight of a composite particulate sol primarily containing titanium oxide, tin oxide, and silicon oxide (rutile crystal structure, methanol dispersion, surface treating agent: γ-glycidoxypropyltrimethoxysilane, manufactured by CATALYSTS & CHEMICALS INDUSTRIES, trade name: Optolake) was added thereto, and stir-mixed for 2 hours. Next, 250 parts by weight of epoxy resin (manufactured by NAGASE CHEMICALS, trade name: EX-313) was added thereto and stirred for 2 hours, and then 20 parts by weight of iron (III) acetylacetonate was added thereto and stirred for 1 hour. The mixture was filtered through a 2-µm filter to give a hard coating composition.

Step 3: Lamination of Primer Layer (Application and Drying of the Composition for Forming a Primer Layer)

A plastic lens substrate (refractive index: 1.74, central thickness: 1.1 mm, manufactured by SEIKO EPSON, trade name: SEIKO Prestige) was prepared. The plastic lensi substrate was treated with alkali (immersed in a 2 mol/l aqueous potassium hydroxide solution maintained at 50° C. for 5 minutes, washed with pure water, and then immersed in a 1.0 mol/l sulfuric acid maintained at 25° C. for 1 minute for neutralization), washed with pure water, dried, and then allowed to cool.

An example of a method for producing a plastic lens substrate having a refractive index of 1.74 is as follows. First, in a nitrogen atmosphere, 90 parts by weight of bis (β-epithiopropyl) disulfide and 10 parts by weight of sulfur are stir-mixed at 100° C. for 1 hour. The mixture is cooled, and then 0.05 parts by weight of tetrabutylammonium bromide is mixed therewith as a catalyst to make a uniform mixture. Subsequently, the mixture is filtered through a 0.5-µm PTFE filter, injected into a glass mold for forming a 1.2-mm-thick lens, and polymerized and cured in an oven at a temperature increased from 10° C. to 120° C. over 22 hours, thereby forming a plastic lens substrate 10. The thus-obtained plastic lens substrate 10 had a refractive index of 1.74 and an Abbe number of 33. In addition, the obtained plastic lens substrate 10 was transparent, and the surface conditions thereof were excellent.

The alkali-treated plastic lens substrate was immersed in the primer composition prepared in the step 1 above, and dip-coated at a drawing rate of 300 mm/min. The primer layer composition was thus applied to the plastic lens substrate. Subsequently, the plastic lens having the primer layer composition applied thereto was calcined at 70° C. for 20 minutes, thereby laminating a primer layer in such a manner that the thickness thereof after drying the surface was 500 nm. The primer layer (first layer) having a thickness of 500 nm was thus laminated on the plastic lens substrate (on the surface of the plastic lens substrate).

Step 4: Lamination of Hard Coating Layer (Application and Drying of the Composition for Forming a Hard Coating Layer)

The plastic lens substrate having the primer layer formed thereon was immersed in the hard coating composition prepared in the step 2 above, dip-coated at a drawing rate of 400 mm/min, and calcined at 80° C. for 30 minutes. A hard coating layer (second layer) having a thickness of 2000 nm was thus laminated on the primer layer.

Step 5: Fixing of Primer Layer and Hard Coating Layer

Further, heating was performed in an oven maintained at 125° C. for 3 hours to provide the plastic lens substrate with the primer layer and the hard coating layer formed thereon (plastic lens).

Step 6: Formation of Antireflection Layer

An antireflection layer was formed by vacuum deposition on the plastic lens substrate having the primer layer and the hard coating layer formed thereon. Specifically, plasma treatment (argon plasma 400 W×60 seconds) was performed using a vacuum deposition apparatus (manufactured by SHINCRON) to form a multilayer antireflection layer having five layers, i.e., from the hard-coating-layer side to the air side, a $SiO_2$ layer, a $ZrO_2$ layer, a $SiO_2$ layer, a $ZrO_2$ layer, and a $SiO_2$ layer. The layers were formed so that at a design wavelength λ of 520 nm, the optical thicknesses of the first $SiO_2$ layer, the next a equivalent layer of ZrO2 and SiO2, the following $ZrO_2$ layer, and the topmost $SiO_2$ layer were each λ/4. Accordingly, a plastic lens having the primer layer, the hard coating layer, and the antireflection layer was produced.

Example 2

A plastic lens was produced in the same manner as in Example 1, except that the polyurethane resins used in the step 1 of Example 1, the preparation of a primer composition, were changed into 285 parts by weight of a first polyurethane resin (Component (A1), average particle diameter: 30 nm, water dispersion, solid content: 35%, manufactured by DAI-ICHI KOGYO SEIYAKU, trade name: Superflex 210), 260 parts by weight of a third polyurethane resin (Component (A3), average particle diameter: 50 nm, water dispersion, solid content: 38%, manufactured by DAI-ICHI KOGYO SEIYAKU, trade name: Superflex 460), and 400 parts by weight of a second polyurethane resin (Component (A2), average particle diameter: 250 nm, water dispersion, solid content: 30%, manufactured by DAI-ICHI KOGYO SEIYAKU, F2929D).

Example 3

A plastic lens was produced in the same manner as in Example 1, except that the polyurethane resins used in the step 1 of Example 1, the preparation of a primer composition, were changed into 300 parts by weight of a first polyurethane resin (Component (A1), average particle diameter: 30 nm, water dispersion, solid content: 35%, manufactured by DAI-ICHI KOGYO SEIYAKU, trade name: Superflex 210) and 630 parts by weight of a second polyurethane resin (Component (A2), average particle diameter: 250 nm, water dispersion, solid content: 30%, manufactured by DAI-ICHI KOGYO SEIYAKU, F2929D).

Example 4

A plastic lens was produced in the same manner as in Example 1, except that the polyurethane resins used in the step 1 of Example 1, the preparation of a primer composition, were changed into 180 parts by weight of a first polyurethane resin (Component (A1), average particle diameter: 30 nm, water dispersion, solid content: 35%, manufactured by DAI-ICHI KOGYO SEIYAKU, trade name: Superflex 210) and 770 parts by weight of a second polyurethane resin (Component (A2), average particle diameter: 250 nm, water dispersion, solid content: 30%, manufactured by DAI-ICHI KOGYO SEIYAKU, F2929D).

Example 5

A plastic lens was produced in the same manner as in Example 1, except that the polyurethane resins used in the step 1 of Example 1, the preparation of a primer composition, were changed into 420 parts by weight of a first polyurethane resin (Component (A1), average particle diameter: 30 nm, water dispersion, solid content: 35%, manufactured by DAI-ICHI KOGYO SEIYAKU, trade name: Superflex 210) and 390 parts by weight of a second polyurethane resin (Component (A2), average particle diameter: 50 nm, water dispersion, solid content: 38%, manufactured by DAI-ICHI KOGYO SEIYAKU, trade name: Superflex 460). Superflex 460 has a polyurethane resin containing a carbonate backbone, and thus is treated as a second polyurethane resin herein.

Comparative Example 1

A plastic lens was produced in the same manner as in Example 1, except that the polyurethane resins used in the step 1 of Example 1, the preparation of a primer composition, were changed into only 840 parts by weight of a first polyurethane resin (Component (A1), average particle diameter: 30 nm, water dispersion, solid content: 35%, manufactured by DAI-ICHI KOGYO SEIYAKU, trade name: Superflex 210).

Comparative Example 2

A plastic lens was produced in the same manner as in Example 1, except that the polyurethane resins used in the step 1 of Example 1, the preparation of a primer composition, were changed into only 980 parts by weight of a second polyurethane resin (Component (A2), average particle diameter: 250 nm, water dispersion, solid content: 30%, manufactured by DAI-ICHI KOGYO SEIYAKU, F2929D).

Evaluation

The plastic lenses obtained in Examples 1 to 5 and Comparative Examples 1 and 2 were evaluated by the following evaluation methods.

(I) Interference Fringes

In a dark box, each plastic lens was observed for interference fringes under a three-band fluorescent lamp (manufactured by MATSUSHITA ELECTRIC INDUSTRIAL, trade name: National Palook), and evaluated in accordance with the following criteria.

Good: Excellent level, almost no interference fringes observable

Fair: Slightly unsightly level, interference fringes observable

Poor: Unsightly level, interference fringes notably observable (II) Shock Resistance Falling ball test was conducted according to U.S. FDA standards. A steel ball having a mass of 16.3 g was dropped from a height of 87 cm vertically above each plastic lens with the convex side up. With respect to lenses that were not broken, the steel ball was dropped again from a height increased by 20 cm, and the height at the time of failure was measured. From an average of failure heights with respect to five lenses of the same level, classification was made as follows. In the falling ball test, the central thickness of a plastic lens substrate was 1.1 mm. Using a steel ball having a mass of 16.3 g, a failure height of more than 127 cm meets U.S. FDA standards.

Excellent: Not less than 187 cm
Good: Not less than 147 cm to less than 187 cm
Fair: Not less than 127 cm to less than 147 cm
Poor: Less than 127 cm (III) Haze Measurement Using an automatic haze computer (TM double beam, light source: D65, manufactured by SUGA TEST INSTRUMENTS, product name: HZ-2) the ratio of diffuse transmission to total transmission was expressed as a normalized value. Based on the normalized value, the degree of cloudiness of each plastic lens having a primer layer (thickness: 0.5 µm) and a hard coating layer (thickness: 2 µm) laminated on a plastic substrate was evaluated. The evaluation was made in conformity with JISK7136 (determination of haze for plastic transparent materials). A haze value that serves as an index for the degree of cloudiness can be calculated by the following formula. A smaller haze value indicates higher transparency.

Haze value=$Td/Tt \times 100$ (Td: diffuse transmission, Tt: total transmission)
Good: Haze value of less than 0.1
Poor: Haze value of not less than 0.1

Evaluation Results

FIG. 2 shows a summary of production conditions for the plastic lenses of Examples 1 to 5 and Comparative Examples 1 and 2, and the results of evaluation thereof.

The plastic lenses of Examples 1 to 5 showed excellent results in terms of interference fringes, shock resistance, and haze value. This is presumably because the primer layers thereof were each formed using a first composition including a first polyurethane resin containing an aromatic ring, a second polyurethane resin containing a, carbonate backbone, metal oxide particulates, and an organosilicon compound.

Further, with respect to shock resistance, the results from the plastic lenses of Examples 1 to 4 were superior to that from the plastic lens of Example 5. This is presumably because the high-molecular-weight polyurethane resin F2929D therein formed a linear matrix having flexibility, thereby developing shock resistance.

Comparative Example 1 showed excellent results in terms of interference fringes and haze value, but the shock resistance thereof was poor. This is presumably because only one kind of polyurethane resin containing an aromatic ring and having a relatively small average particle diameter was used.

Comparative Example 2 showed excellent results in terms of shock resistance, but the haze value thereof was poor, and the formation of interference fringes was also observed. This is presumably because only one kind of polyurethane resin containing an aromatic ring and a carbonate backbone, but having a relatively large average particle diameter, was used.

In contrast to these comparative examples, with respect to shock resistance, the results from the plastic lenses of Examples 1 to 4 were superior to that from the plastic lens of Example 5. This is presumably because the high-molecular-weight polyurethane resin F2929D therein formed a linear matrix having flexibility, thereby developing shock resistance. Further, this could also be because Superflex 210 (in Examples 1 and 2, Superflex 460 in addition to Superflex 210) compensates for the above-mentioned linear matrix, and, while accelerating the formation of a three-dimensional network, acts in voids in the matrix of F2929D.

Although almost no differences are observed from the evaluation results, with reference to the concrete numerical values obtained in the shock resistance test, the results of the observation of interference fringes, and so forth, the evaluation results from Examples 1 and 2 containing Superflex 210, Superflex 460, and F2929D were particularly excellent among the above examples. In Examples 1 and 2, presumably, crystal portions are formed by Superflex 210 and F2929D containing an aromatic ring, voids are filled with Superflex 210 and Superflex 460 having a small average particle diameter, and further, shock is relieved by Superflex 460 having high flexibility.

Superflex 210 and F2929D both have an aromatic ring, and they have a small average particle diameter and a large average particle diameter, respectively. Therefore, due to the crystallization interaction and compensating effects, a highly compact primer layer can be formed. This thus enables a primer layer with a high refractive index and excellent compactness. However, when crystal portions are formed in excess, the resulting compactness is too high, and this may slightly reduce the shock resistance. In Examples 1 and 2, use of carbonate-based Superflex 460 mitigates the excessive formation of crystal portions, thus providing excellent shock absorption.

F2929D has an aromatic ring. However, as shown in Comparative Example 2, because the average particle diameter thereof is relatively large, and therefore, when F2929D is used alone, hard segments are not likely to be formed densely due to the steric barrier and the like. This reduces the likelihood that optical performance will be obtained. Meanwhile, as shown in Comparative Example 1, use of Superflex 210 alone provides excellent optical performance, but reduces the likelihood that shock resistance will be obtained.

As mentioned above, according to the embodiments as in Examples 1 to 5, a plastic lens having excellent shock resistance and exhibiting almost no interference fringes can be provided.

The optical article of the invention is suitable for use as a plastic lens. Examples of optical articles encompassed by the invention include optical lenses such as spectacle lenses, camera lenses, lenses for telescopes, lenses for microscopes, condensing lenses for steppers, and lenses for optical equipment. Optical articles to which the invention is applicable are not limited to optical lenses. Examples of optical articles encompassed by the invention also include display panels such as liquid crystal displays, optical recording media such as DVDs, and other articles that transmit or reflect light.

The entire disclosure of Japanese Patent Application No: 2009-110471, filed Apr. 30, 2009 is expressly incorporated by reference herein.

What is claimed is:

1. A spectacle lens comprising a plastic substrate and a first layer formed on the plastic substrate, wherein
the first layer has a refractive index decreasing in a direction away from the plastic substrate,
the first layer is formed using a first composition including a first polyurethane resin containing an aromatic ring, a second polyurethane resin containing a carbonate backbone and an aromatic ring, a third polyurethane resin containing a carbonate backbone, metal oxide particulates, and an organosilicon compound, the first polyurethane resin has an average particle diameter d1 of 20 nm to 40 nm, the second polyurethane resin has an average particle diameter d2 of 60 nm to 400 nm, the third polyurethane resin has an average particle diameter d3 of 40 nm to 60 nm, and the metal oxide particulates have an average particle diameter dm of 5 nm to 60 nm.

2. The spectacle lens according to claim 1, further comprising a second layer formed on the first layer, the second layer having a refractive index lower than that of the plastic substrate.

* * * * *